Aug. 24, 1948. C. H. HAZELTON 2,447,856
CHRISTMAS CARD DISPLAY DEVICE SIMULATING A TREE
Filed June 14, 1945
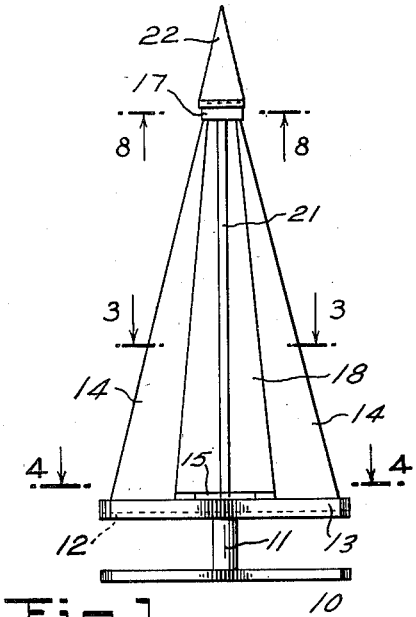
Fig. 1.
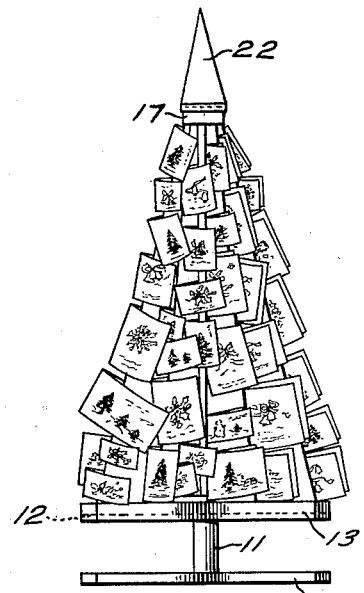
Fig. 2.
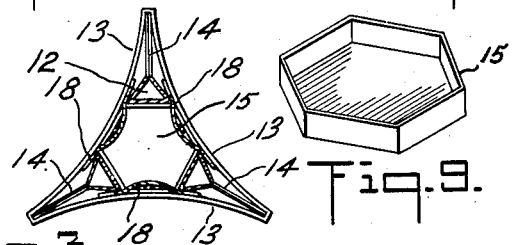
Fig. 3. Fig. 9.
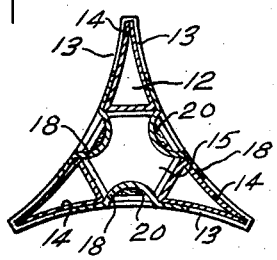
Fig. 4.
Fig. 8.
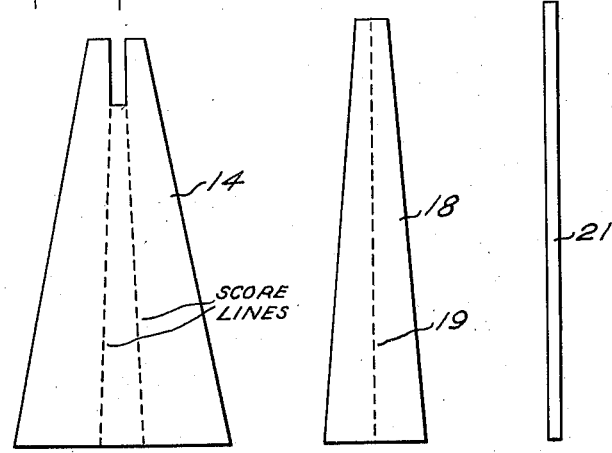
Fig. 5. Fig. 6. Fig. 7.
INVENTOR.
CLARENCE H. HAZELTON
BY
ATTORNEYS Patented Aug. 24, 1948

2,447,856

UNITED STATES PATENT OFFICE 2,447,856

CHRISTMAS CARD DISPLAY DEVICE SIMULATING A TREE

Clarence H. Hazelton, Upper Darby, Pa.

Application June 14, 1945, Serial No. 599,467

4 Claims. (Cl. 40—124)

The present invention relates to devices for displaying cards or the like and more particularly a display device wherein the arrangement of cards thereon transforms the device into an ornamental object simulating, for example, the appearance of a Christmas tree.

In card display devices heretofore in use the object has been to provide a means for supporting cards so that customers in a store could examine each card and thereby quickly and easily make a selection for purchase. Such devices are used in stationery stores, drug stores, gifts shops, and the like, as an aid to buyers and also to attract buyers to an inspection of the cards.

Some of the objects of the present invention are: to provide an improved device for supporting a collection of cards conveniently and attractively; to provide a device to be sold in homes so that Christmas cards received in the family can be assembled thereon instead of being scattered about everywhere in the house where they are lost or misplaced; to provide a device so arranged and constructed that cards can be quickly attached thereto in such an arranged manner as to give an ensemble appearance of a decorated Christmas tree; to provide a card supporting device of knock-down form which can be quickly assembled, serve its purpose as a support for a large number of cards, and having served its purpose be put away for use again at some future time; and to provide other improvements as will hereinafter appear.

In the accompanying drawings, Fig. 1 represents a side elevation of a display device embodying one form of the present invention; Fig. 2 represents the same as filled with cards to simulate a Christmas tree in appearance; Fig. 3 represents a section on line 3—3 of Fig. 1; Fig. 4 represents a section on line 4—4 of Fig. 1; Fig. 5 represents a front elevation of one of the backing members; Fig. 6 represents a front elevation of one of the card-holding sheets; Fig. 7 represents a front elevation of one of the flexing holding strips; Fig. 8 represents a section on line 8—8 of Fig. 1 on an enlarged scale; and Fig. 9 represents a perspective view of the retainer.

Referring to the drawings, one form of the present invention comprises a base 10 having a centrally disposed column 11 carrying a platform 12, here shown in the shape of a triangle having concave sides with upstanding walls 13 attached thereto. These walls 13 form lateral supports for the outer faces of three backing members 14. Each of these members 14 is formed preferably of cardboard, though obviously any stiff material may be used. Each of these members is of pyramid shape, having two score lines 15, symmetrical with respect to the median line of the member, and diverging from the apex downward. When folded along the score lines 15, the two half portions of the member form a triangle in transverse section and the bottom of each is arranged to seat in the groove formed by the converging walls 13 of the platform. When so seated the narrow backs of the three members form a three-sided space into which a cup-shaped retainer 15 is located, having plane surfaces in contact respectively with the aforesaid back portions of the members 14. Thus, the three members 14 are firmly held at the base portions between the retainer 15 and the walls 13.

In order to hold the narrow upper ends of the members 14 in place, each is provided with an end slot to leave each end as bifurcated and sufficiently resilient to lie against the three sides of a reinforcing element 16 and be gripped by an encircling collar 17. Both the element 16 and the collar 17 are of triangular frustum shape for proper surface contact with the ends of the inner and outer faces of the members 14. Thus, the three members 14 as assembled on the platform, the walls 13 and the retainer 15 firmly anchor the base part while the three top apices are gripped between the element 16 and the collar 17, and the result in appearance is that of a three-sided closed pyramid having concave sides.

In order to provide means for readily mounting and supporting cards on the formed pyramid, three card-gripping sheets 18 of stiff material are provided, one to lie along the outer face of each member 14. These sheets 18 taper convergingly upward, from a base having a width approximately one half of the base of each member, to a small end of a size to be inserted within the collar 17. Medially, each sheet 18 is provided with a score line 19 so that it can be pressed into face contact with the curved face of a member 14. The bottom edge of each sheet 18 rests upon the upper margin of the retainer 15 to thereby expose three portions of the open end of the retainer 15 and which portions form sockets 20 for a purpose later to be described.

In order to provide an effective gripping action by the sheets 18 upon any cards inserted under the edges thereof, relatively narrow stiff strips 21 of wood or other material are superposed exteriorly and medially of the respective sheets 18, the lower ends of which are respectively seated in the sockets 20 while the upper ends thereof pass through the collar 17 and are held thereby. This, due to the angular spread of the strips 21 plus the holding action of the retainer 15 an inward pressure is exerted by all of the strips to hold the sheets 18 firmly against the members 14. The outer face of each of the strips 21 is painted brown in color to give the appearance of a tree trunk. Also, the faces of the sheets and members are to be painted to represent tree limbs and evergreen foliage.

As a finish to the top of the tree-shaped pyramid, a cap or spire 22 is provided and dimensioned to fit snugly over the collar 17, though any other ornamental object may be used which will serve to accentuate the tip of a tree and preserve the desired illusion when the cards are arranged thereon.

Since the display assembly is in knock-down form, it can be delivered to purchasers who can readily assemble it into a stable support. This is accomplished by folding the members 14 along the score lines into triangular form and fitting them into the space formed by the platform walls 13 and abutting the retainer 15. The slotted top ends are then brought together against the sides of the reinforcing element 16 and the truncated collar 17 slipped over the ends and pressed tightly to holding position. Thus, a three-sided closed pyramid is formed of proper tapered appearance to give the desired tree effect. The sheets 18 are now placed in position with the upper ends thereof gripped under the collar 17 and held by inserting the strips 21 in the sockets 20 of the retainer 15, and pressing the top narrow ends thereof through the collar 17. With the cap 22 in place, the device is ready to have the cards arranged thereon.

From the foregoing it will be apparent that the hollow triangular shape of the device provides three broad curved surfaces for the most effective arrangement and display of the cards. By reason of the tight surface fit of the sheets 18, the cards can be easily slipped back of the sheet margins and being held frictionally they can be arranged to protrude beyond each sharply angled corner and thus lie back to back with cards on the opposite side. Also, the overlapping of the cards along the three corners gives a jagged outline like evergreen foliage and the effect viewed from any angle is that of a Christmas tree silhouette.

I claim:

1. A display device for simulating a Christmas tree, comprising a platform, pedestal means for supporting said platform, a plurality of pyramidal shaped members supported by said platform and arranged in assembled condition to form an elongated tree-shaped body, means connecting the upper ends of said members together, sheets respectively arranged in face contact with said members and held by said connecting means, strips arranged respectively against said sheets and held by said connecting means at the upper ends, and means engaging the lower ends of said strips to flex said strips against said sheets, whereby cards inserted under the margins of said sheets and under said strips are frictionally held and can be arranged to give the decorative effect of a Christmas tree.

2. A display device for simulating a Christmas tree, comprising a platform, pedestal means for supporting said platform, a plurality of pyramidal shaped members supported by said platform and arranged in assembled condition to form an elongated tree-shaped body, means connecting the upper ends of said members together, sheets respectively arranged in face contact with said members and held by said connecting means, a decorative cap surmounting said connecting means, strips arranged respectively against said sheets and held by said connecting means at the upper ends, and means engaging the lower ends of said strips to flex said strips against said sheets, whereby cards inserted under the margins of said sheets and under said strips are frictionally held and can be arranged to give the decorative effect of a Christmas tree.

3. A display device for simulating a Christmas tree, comprising a platform having an encircling wall, pedestal means for supporting said platform, a cup-shaped retainer seated upon said platform, three pyramidal shaped members supported by said platform and gripped between said wall and said retainer to form an elongated tree-shaped body, means connecting the upper ends of said members together, sheets respectively arranged in face contact with said members and seated on said retainer at the bottom and held by said connecting means at the top, and strips flexed between said connecting means and said retainer for holding said sheets pressed against said body, whereby cards inserted under the margins of said sheets and under said strips are frictionally held and can be arranged to give the decorative effect of a Christmas tree.

4. A display device simulating a Christmas tree, comprising a platform, three side members formed of bendable material, each member being arranged to fold to substantially triangular form in cross section, means to support said members on said base in side to side relation, supplemental sheets of material mounted on said base to respectively overlap each pair of said members, retaining strips respectively holding said sheets against said members, and cap means receiving the upper ends of said members, sheets and strips, whereby the overlapped sheet margins form means to insert cards to produce an overall simulation of a Christmas tree.

CLARENCE H. HAZELTON.

REFERENCES CITED

The following references are of record in the file of this patent:

UNITED STATES PATENTS

| Number | Name | Date |
|---|---|---|
| 256,296 | Currier | Apr. 11, 1882 |
| 259,771 | McLoughlin | June 30, 1882 |
| 339,173 | Heaton | Apr. 6, 1886 |
| 516,262 | Claflin | Mar. 13, 1894 |
| 1,408,469 | Rand | Mar. 7, 1922 |
| 1,420,433 | Mallon | June 20, 1922 |
| 1,575,129 | Schenck | Mar. 2, 1926 |
| 1,657,074 | Eilertsen et al. | Jan. 24, 1928 |
| 1,692,404 | Conwell | Nov. 20, 1928 |
| 2,265,371 | Hoffman | Dec. 9, 1941 |